3,340,216
POLYMERIC COATING COMPOSITIONS OF BLEND OF POLYTETRAFLUOROETHYLENE, AND VINYLIDENE CHLORIDE, ACRYLONITRILE, UNSATURATED CARBOXYLIC ACID TERPOLYMER
Henry Patrick Bradshaw Mack, Hitchin, England, assignor to Imperial Chemical Industries Limited, London, England, a corporation of Great Britain
No Drawing. Filed Jan. 28, 1966, Ser. No. 523,554
Claims priority, application Great Britain, Feb. 18, 1965, 7,074/65
6 Claims. (Cl. 260—29.6)

ABSTRACT OF THE DISCLOSURE

Dispersions of tetrafluoroethylene polymer particles in a volatile liquid useful in the formation of coatings. The dispersion also contains a copolymer of vinylidene chloride, acrylonitrile and a comonomer containing carboxylic acid groups, there being 70–95% by weight vinylidene chloride in the copolymer and $0.5/X$ to $5/X$ mole percent of said comonomer where X is the number of carboxylic acid groups in the comonomer. The dispersion is dried on a substrate at room temperature to 180° C. and forms a coating of colloidal tetrafluoroethylene particles in a matrix of the copolymer.

Disclosure

The present invention relates to dispersions of fluorine-containing polymers and to coatings formed therefrom.

It has long been known that films of a tetrafluoroethylene polymer may be applied to substrates by depositing polymer particles of colloidal size from dispersions in a volatile liquid medium (generally water) and heating the coating so formed to a temperature (which must be above 327° C. for the homopolymer and may be as high as 400° C.) in order to sinter it. The films have many desirable characteristics such as high dielectric strength, non-wetting by water, resistance to corrosive materials such as acids and alkalis and excellent antifriction properties. However, they have the disadvantages that the bond formed with the substrate is often very weak and that the sintering step frequently mars the properties of the substrate. Because tetrafluoroethylene polymers are generally insoluble in known solvents and therefore must be applied from suspension, they have poor covering properties and do not readily cover sharp edges and corners or irregular surfaces such as rough weld seams resulting from two pieces of metal meeting at an angle. If applied too thickly, they tend to form cracks through which the substrate may be exposed to corrosion. Moreover, because of the generally poor bond, once an undesirable fluid has penetrated a crack it may spread under the coating thereby negating its protective role.

It is known that the bond between the coating of a tetrafluoroethylene polymer and the substrate may be improved by suitable preparation of the substrate such as thorough degreasing which, in the case of metals, may be followed by a suitable roughening process by chemical etching, by sandblasting or by electrolytic means. However, all these processes have the disadvantage of depending upon the sintering step to cause the final bonding between the individual particles of tetrafluoroethylene polymer and thus the coating cannot be applied in this way to materials such as paper, linen, wood, rubber and certain plastics which would be degraded during the sintering step or to metals whose properties such as hardness would be affected adversely by the sintering step.

The present invention provides a dispersion of a fluorine-containing polymer which may be applied to any self-supporting substrate which is capable of withstanding heating at normal drying temperatures to give a strongly-bonded coating having many of the desirable properties associated with polytetrafluoroethylene without the need for a sintering step.

According to the present invention a polymeric coating composition comprises a dispersion in a volatile liquid of a tetrafluoroethylene polymer and a vinylidene chloride compolymer, the ratio of the weights of the tetrafluoroethylene polymer and the vinylidene chloride copolymer being in the range 9:1 to 1:19, and the vinylidene chloride copolymer itself containing 95% to 70% by weight of vinylidene chloride and 5% to 30% by weight of copolymerisable ethylenically unsaturated monomeric material. The combined amounts of tetrafluoroethylene polymer and vinylidene chloride copolymer in the volatile liquid are such that a stable dispersion is obtained.

The tetrafluoroethylene polymer is generally a homopolymer of tetrafluoroethylene. Copolymers of tetrafluoroethylene with minor amounts (up to about 10% by weight at most) of other ethylenically unsaturated monomeric material (e.g. hexafluoropropene or ethylene) are also included within this term when such copolymers exhibit the properties normally associated with polytetrafluoroethylene, that is: low coefficient of friction, excellent resistance to acids and alkalies, and good dimensional stability at temperatures of 200° C. or more. These desirable properties generally approach those associated with polytetrafluoroethylene with decrease in the amount of comonomer present.

The particles of tetrafluoroethylene polymer used in the dispersions are formed of a polymer which has such a high degree of crystallinity as to be normally solid and dispersible in a liquid medium to form a stable dispersion. Such particles are known in the art and may be formed, for example, by pulverising dry polymer in a fluid energy mill. Another and very convenient way of forming the polymer particles is to polymerise the monomer or monomers in an aqueous medium in the presence of a water-soluble catalyst and a dispersing agent to yield a stable colloidal dispersion, for instance as described in British patent specifications 689,400 and 821,353.

The vinylidene chloride copolymers used in the dispersions require the following characteristics:

(i) In the presence of tetrafluoroethylene polymers, they must be capable of forming a strong bond with the surface to be coated;

(ii) They must be compatible with the tetrafluoroethylene polymer and with its suspensions, i.e. they must be soluble in or capable of forming dispersions in liquid media in which from 5% to 90% of the resin content is dispersed tetrafluoroethylene polymer to give dispersions which will not gel, flocculate, settle out or otherwise change phase before they may be applied in final form to the surface to be coated;

(iii) They must be substantially unreactive with the tetrafluoroethylene polymers, at least to the extent that any reaction occurring will not destroy the desired properties of either the vinylidene chloride copolymer or the tetrafluoroethylene polymer, either while the dispersions are being made or during the coating operation or any later treatment (e.g. drying) that may be required;

(iv) They should spread and flow well when in the form of coating compositions, being capable of bridging small holes and seams to give a substantially continuous film, and they should retain these characteristics after being mixed with the tetrafluoroethylene polymer;

(v) Preferably they should be corrosion-resistant and give tough, strong and durable films.

As coatings deposited from the dispersions need not be sintered at the temperatures normally used for sintering tetrafluoroethylene polymers, it is not necessary for the vinylidene chloride copolymers to be thermally stable at such temperatures. However, thermal stability at moderately elevated temperatures (e.g. around or somewhat above the boiling point of water) is a useful property for many purposes.

The essential properties are generally found in copolymers of 95% to 70% by weight of vinylidene chloride and correspondingly from 5% to 30% by weight of copolymerisable ethylenically unsaturated monomeric material. The nature of the copolymerisable material must be such as to reduce the symmetry of the polyvinylidene chloride chains and lower the softening point of the polymer so that the individual particles fuse to form a continuous film at a suitable drying temperature. Such copolymers have been discussed widely in the prior art. The choice of the comonomer and the amount used within the limits specified above will depend upon the temperature at which the coating from the dispersion is to be dried; however, the choice is preferably such that the softening point of the copolymer particles in the amorphous form is not greater than about 50° C. because of the ease with which suitable coatings are formed with particles of such a copolymer under normal drying conditions. Copolymers with much higher softening points may be used but the formation of a continuous film from them becomes increasingly difficult as the softening point increases.

In general the comonomeric material employed with the vinylidene chloride is selected from: (a) monoethylenically unsaturated mono- and polycarboxylic acids and their esters, anhydrides and nitriles, (b) esters of mono- or polycarboxylic fatty acids and monoethylenically unsaturated alcohols, (c) halogen-substituted derivatives of ethylene, (d) monoethylenically unsaturated aldehydes and ketones, and (e) dienes. Particular examples are: (a) acrylic acid, α-chloroacrylic acid, methacrylic acid, maleic acid, fumaric acid, crotonic acid, mesaconic acid, aconitic acid and itaconic acid and their esters, anhydrides and nitriles; (b) vinyl esters of monocarboxylic fatty acids; (c) vinyl halides; (d) methacrolein and vinyl methyl ketone; and (e) isoprene and butadiene. Acrylic and methacrylic acids and their esters with alcohols having up to eight carbon atoms, acrylonitrile, methacrylonitrile, maleic and fumaric acid and itaconic acids and their partial and complete esters with alcohols having up to eight carbon atoms, maleic anhydride, itaconic anhydride, vinyl acetate and vinyl chloride may be regarded as particularly suitable.

The optimum choice of comonomeric material and the amount used to achieve optimum bonding with the substrate and optimum spreading and flow in the coating compositions may vary with the nature of the substrate, but as a general rule those vinylidene chloride copolymers which in the absence of tetrafluoroethylene polymer have the desired properties in the form of dispersions or solutions will retain these properties when mixed with the tetrafluoroethylene polymer dispersions. Thus, suitable vinylidene chloride copolymers for given substrates may be determined by simple experiment.

Increased polarity of the vinylidene chloride copolymer generally improves adhesion to most substrates, particularly metals, glass and paper. A copolymer that is useful for most applications where acidic groups are not a disadvantage is a copolymer of vinylidene chloride, acrylonitrile, and a monomer containing at least one free (i.e. uncombined) carboxylic acid group, e.g. acrylic acid. This monomer should be present in the copolymer in amounts of at least $0.5/X$ mole percent but generally not more than $5/X$ mole percent where X is the number of free carboxylic acid groups in the molecule of the monomer. Suitable copolymers of this kind and methods of producing them are described in British patent specification 1,011,500.

The vinylidene chloride copolymer may be dispersed with the tetrafluoroethylene polymer in the volatile liquid medium or may be dissolved in the medium. The volatile liquid medium may be water or any organic liquid in which the tetrafluoroethylene polymer may be dispersed without modification of its properties to give a stable dispersion, in which the vinylidene chloride copolymer may be dissolved or dispersed to give a stable solution or dispersion without modification of its properties, and which may be volatilised at a temperature which has no significant deleterious effect on the properties of the coating deposited therefrom. Very suitable organic liquids may be chosen from alcohols, ethers, aliphatic and aromatic hydrocarbons, chlorinated hydrocarbons, esters and ketones which can be vaporised preferably below 150° C.

Water is generally preferred because of its non-inflammability and for economic reasons. Co-dispersions in water are readily made simply by mixing an aqueous dispersion of tetrafluoroethylene polymer with an aqueous dispersion of vinylidene chloride copolymer. This is particularly convenient since both polymers are normally prepared by polymerisation in water. In order to obtain stable aqueous dispersions it is usual to effect the polymerisation in the presence of surface-active agents which may be anionic or non-ionic in character, and in making the dispersions of the present invention by mixing two aqueous dispersions care must be taken to ensure that the aqueous dispersions are compatible, so that coagulation will not occur before application is required. In general a surface-active agent is an essential ingredient in the polymerisation of tetrafluoroethylene to yield stable dispersions (for example, as described in British patent specifications 689,400 and 821,353); but vinylidene chloride copolymers may be prepared by a polymerisation process in an aqueous medium in the absence of conventional emulsifiers, and the dispersions so obtained have found particular use in coating metals and certain plastics where the presence of conventional emulsifiers has been found to impair the bonding of the coating to the substrate.

While the dispersions of the present invention are prepared very simply and without the need of complex or costly equipment by mixing dispersions of the two polymeric ingredients as described above, they may also be prepared if desired by finely grinding dry tetrafluoroethylene polymer and dispersing it in a solution or dispersion of the vinylidene chloride copolymer or by dispersing or dissolving particles of vinylidene chloride copolymer in a dispersion of tetrafluoroethylene polymer, or the dispersions may be formed from particles of both polymers in a suitable volatile liquid medium.

The ratio of the weights of the tetrafluoroethylene polymer and the vinylidene chloride copolymer is in the range 9:1 to 1:9. Increasing the amount of the tetrafluoroethylene polymer increases the resistance to corrosion and the anti-frictional properties of coatings formed from the dispersion but where the amount exceeds three times that of the vinylidene chloride copolymer by weight the bonding to glass and to metallic substrates tends to show signs of weakness. On the other hand, the anti-frictional properties of the coating are most useful if the proportion of tetrafluoroethylene polymer is at least 17% (i.e. a ratio of 1:5). Amounts of 65% to 30% are very satisfactory for most purposes, the vinylidene chloride copolymer making the total to 100% (expressed in terms of a ratio this range is 7:3 to 7:13).

The total amount of polymeric material that may be present to give a stable dispersion varies with choice of liquid and the nature and concentration of the dispersing agent or agents. However, stable dispersions of tetrafluoroethylene polymer and of vinylidene chloride copolymer as usually prepared will (if compatible) generally give a stable mixed dispersion. If both polymeric constituents are in the disperse phase, their combined amount should generally not exceed 60% by weight of the dispersion when long term storage is envisaged although a higher solids content may be used where application follows closely on preparation of the dispersion. The dispersion may be diluted using a compatible liquid (conveniently the liquid present in the dispersion itself, e.g. water); such diluted dispersions may be more suitable for applying thin even coats on some substrates. The combined amount of both polymeric constituents is conveniently at least 3% by weight of the dispersion. Additional dispersing and surface-active agents may be incorporated, the types and amounts being selected to suit the concentration of the dispersion and the way in which it is to be used.

The dispersions of the invention may be applied to the substrate by any suitable process such as dipping, spraying, brushing or air-knife or doctor-knife coatings and the coatings are then dried, driving off the volatile liquid medium by externally supplied heat (e.g. in an oven) or by using a preheated substrate. Any substrate may be coated with the dispersions and examples include paper, cardboard, leather, woven materials derived from natural fibres such as cotton or wool or from synthetic fibres, fibrous materials such as asbestos and glass fibres, wood, plastic and metal; the only limitation on the substrate that may be used is that it will not disintegrate during the drying step.

In many instances the dispersions may be applied direct to the substrate but it is often desirable to treat the substrate first; for example, metal surfaces should be degreased thoroughly. Where the dispersion contains water or a water-miscible liquid as the liquid phase, it is not necessary that the surface to be coated should be dry although it is generally preferable to remove excess moisture. The preliminary application of primers to the substrate is not required although their use is not excluded.

Multiple applications, preferably with a drying step between each, may be used to build up a thicker coat. The dispersion may conveniently be applied by spraying from a compressed air gun, or it may be applied in the form of an aerosol where small scale use is envisaged as for instance in the home. Many substrates can easily be coated by dipping. For others, rollers may be a convenient way of applying the dispersion.

In addition to the polymeric ingredients specified, the dispersions may also include other ingredients: for example, fillers, pigments, dyes, stabilisers of the polymeric ingredients against heat and light, and small amounts of other plastics and/or rubbers.

The dispersions are particularly useful for coating substrates which would normally be affected adversely during the usual step of sintering the tetrafluoroethylene polymer. For example, the tempering of many metals and alloys (e.g. carbon steel, copper) is affected adversely by heating at the temperature for sintering, with the result that the hardness of the metal may be reduced by as much as one half. In the past, therefore, when it has been desired to coat metal surfaces with tetrafluoroethylene polymers it has often been found necessary to use a modified alloy capable of withstanding the sintering step or else to sacrifice some of the properties of the tempered metal. On the one hand, the development of a modified alloy involves expensive research while, on the other hand, the loss of properties that occurs during the sintering step may restrict the use of the coated article.

The dispersions of the invention have the advantage of requiring a simple drying step at room temperature or only moderately elevated temperatures (less than 180° C.) in place of the sintering at high temperatures normally associated with the previously used processes of coating with tetrafluoroethylene polymers. For consistently good results a temperature somewhat above 50° C. has been found desirable where aqueous dispersions have been used. Conditions for drying the vinylidene chloride copolymers disclosed therein are discussed in British patent specification 1,011,500 where 100–140° C. is said to be preferred. Brown discolouration may occur above 140° C. Thus satisfactory coatings may be obtained from the dispersions by an operator who has a hot air drier or small oven at his disposal. It is most convenient to preheat an object of adequate thermal capacity to the desired drying temperature before applying the dispersion, as an adherent film is then quickly formed without the need to supply more heat. Furthermore, the sintering of coatings on large objects has always presented difficulties which may be insuperable in the case of complex shapes and these shortcomings also may be overcome by the use of the dispersions of the invention.

The presence of the suspending liquid, e.g. water, allows the film to be formed at a lower temperature than would otherwise be the case, because the surface tension of the drying liquid exerts pressure on the polymer particles to form a coherent layer. In the absence of the liquid, the temperature would have to be higher so as to cause greater softening of the vinylidene chloride copolymer. The latent heat of the evaporating liquid may keep the actual temperature of the coating site well below the temperature of the bulk of the substrate or the surrounding air.

The film formed according to the invention as a coating on a surface of the substrate comprises the tetrafluoroethylene polymer in unsintered particles of colloidal size (e.g. of average diameter $0.05-0.5\mu$) held in a matrix of the vinylidene chloride copolymer.

Coating according to the invention may be used to provide many of the desirable properties of coatings derived from tetrafluoroethylene polymers alone, especially low friction and resistance to adhesion by extraneous substances, and it is particularly advantageous with cutting instruments where the coating is applied to the surface immediately adjacent to the cutting edge. Examples are razor blades, scissors, guillotines and garden tools. The dispersions are especially suitable for coating razor blades because the metal from which the blade is formed need not then be one which has the ability of withstanding a sintering temperature of 300° C. or more.

Other metallic substrates may be coated, and also other materials including wood, textiles, paper, plastics and glass. For example, the dispersions containing any desired fillers may be used to coat the runners of skis and toboggans, the inside of fish boxes, the sliding surfaces of drawers in furniture, feed chutes, wine presses, protective clothing, tarpaulins, oilskins, waders, and nets. They may be applied to paper (or fabric) to make release papers and non-adhesive wound dressings (e.g. for burns). They may be used to coat leathercloth, ice-making compartments and trays in refrigerators, plates in deep-freeze and cold-store rooms, leaf springs for vehicle suspension, ice-skates, lift guides, carburettor parts, cables, confectionary moulds, snow shovels, snow ploughs, and wire ropes, and remote control gear on sea-going craft. They may also be used in photography, for example on shutter mechanisms, film cassettes and film backing plates. They may be used in providing any desired coating on sheets and films of thermoplastics, for example polyester film as used in photography and sound recording. Other applications include anti-ice coatings and coatings on rubber conveyor belts, the inside of rubber gloves and skin-diving suits and the sliding surfaces of sash windows. The dispersions may be used to increase the maximum speed of ships and boats by coating the propeller and the normally submersed surface of the hull; cavitation effects are thereby diminished. They may be used to coat cartridge cases (as described in British patent specification 804,178) and other ammunition and weapons (as described in Industrial and Engineering Chemistry, (May 1958), 50, pages 781 to 784). The dispersions may also be used to coat wire and other electrical conductors.

The invention is illustrated by the following examples in which all parts are expressed as parts by weight.

Example 1

A number of stable aqueous dispersions were prepared containing as polymeric ingredients various amounts of:

(a) A homopolymer of tetrafluoroethylene in the form of approximately spherical colloidal particles (average diameter 0.15 to 0.20μ) prepared by the process described in Example 1 of British patent specification 821,353, concentrated to 60% by weight of polytetrafluoroethylene by an electrodecantation process (similar to that described in British patent specification 642,025) and containing 6% by weight of a commercially available polymeric non-ionic surface-active agent (an alkyl aryl polyether alcohol);

(b) A copolymer of vinylidene chloride prepared by the process of Example 1 of British patent specification 1,011,500, from vinylidene chloride (90 parts), acrylonitrile (10 parts) and acrylic acid (2 parts) to give an aqueous dispersion of approximately 50% solids content and a particle size of 0.13μ.

Each mixed dispersion was sprayed onto unetched degreased aluminium plaques which were dried in an oven at 90° C.

The coated plaques were tested for anti-friction characteristics by measuring the coefficient of friction calculated from the force required at room temperature to slide a polished steel surface of 6.35 mm. radius of curvature along the surface at a constant velocity of 220 cm./minute under a load of 907 g., and for non-wetting characteristics by measuring the angle of contact of a drop of water placed on the coated surface as the average of five readings taken 30 seconds after the drop was placed on the surface. The adhesion of the coating to the substrate was tested by measuring its resistance to scratching. In this test, the coated plaque was mounted on a reciprocating horizontal table below a needle held vertical but free to move in the vertical direction and having its point, a hemisphere 0.076 mm. in diameter, touching the coated plaque. The needle was weighted with 200 g. The table oscillated back and forth below the needle and the number of complete oscillations required for the coating to fail were counted. Failure was detected by setting up an electrical circuit which was closed by the needle touching the metal plaque below the coating.

The amounts of each of the polymers in the dispersion and the results of the tests on the coated aluminium plaques are shown in the following table.

| Percent of each polymer based on total polymer present by weight | | Coefficient of friction | Angle of contact (deg.) | Adhesion (oscillations for failure) |
|---|---|---|---|---|
| Polytetra-fluoroethylene | Vinylidene chloride copolymer | | | |
| 100 | 0 | (¹) | ------- | (²) |
| 84 | 16 | 0.101 | ³ 56 | 12 |
| 73 | 27 | 0.090 | ³ 47 | 38 |
| 68 | 32 | ------- | ³ 82 | 43 |
| 64 | 36 | 0.095 | 80 | 35 |
| 59 | 41 | ------- | 92 | 20 |
| 54 | 46 | 0.089 | 90 | 54 |
| 37 | 63 | 0.097 | 88 | 22 |
| 24 | 76 | 0.084 | 82 | 41 |
| 17 | 83 | 0.091 | 90 | 51 |
| 0 | 100 | 0.121 | 60 | 33 |

¹ Coating disintegrated.
² Failed immediately.
³ In these experiments the drop of water appeared to soak into the coating, thus altering the angle of contact.

From these results it appears that coatings containing as little as 17% of polytetrafluoroethylene have a usefully low coefficient of friction, significantly less than that of a coating of the vinylidene chloride copolymer alone. Further increase of the polytetrafluoroethylene content gives little further improvement in coefficient of friction. Extrapolation of the results indicates that even less polytetrafluoroethylene (e.g. 10% or less) may be used and a useful reduction in coefficient of friction still be obtained. Useful non-wetting properties of the coating (as indicated by the "angle of contact" test) are obtained when the polytetrafluoroethylene comprises from about 15% to 70% by weight of the mixture of polymers, excellent results being obtained with coatings containing from 30% to 65% by weight of polytetrafluoroethylene.

The third series of tests shows how even the presence of only 16% by weight of vinylidene chloride copolymer has a marked effect on the abrasion resistance and that very good abrasion resistance is obtained from coatings containing above 25% by weight of vinylidene chloride copolymer.

These results show that coatings with a very useful combination of properties may be obtained from dispersions containing from about 45 to about 65% by weight of tetrafluoroethylene polymer and correspondingly from about 55 to about 35% by weight of vinylidene chloride copolymer.

Example 2

The dispersions of Example 1 were applied to photographic glazing plates of very highly polished chromium-plated brass, which were then dried in an oven at 90° C. to give a coating between 0.025 mm. and 0.06 mm. thick. The "angle of contact" of a drop of water was then measured as described in Example 1.

The results are shown in the following table.

| Percent of each polymer based on total polymer present by weight | | Angle of Contact (deg.) |
|---|---|---|
| Polytetrafluoro-ethylene | Vinylidene chloride copolymer | |
| 84 | 16 | *49 |
| 73 | 27 | 50 |
| 68 | 32 | 67 |
| 64 | 36 | *66 |
| 59 | 41 | *83 |
| 54 | 46 | 88 |
| 37 | 63 | 58 |
| 24 | 76 | 44 |
| 27 | 83 | 47 |
| 0 | 100 | *41 |

* In these experiments the drop of water appeared to soak into the coating, thus altering the angle of contact.

Example 3

The dispersion of Example 1 containing 54% of polytetrafluoroethylene and 46% of vinylidene chloride copolymer was sprayed on to a metal hot-plate used for heat-shrinking polypropylene film around packages. In this process, the package is fed into a tube of biaxially oriented polypropylene film and the tube is then sealed to form a bag. The bag is passed over a heated plate to cause the film to shrink and take up more closely the shape of the package inside. Frequently the film tends to stick to the heated plate which is therefore generally treated, e.g. by chromium plating or silicone coating, to reduce the likelihood of sticking. The coating formed from the above dispersion protected the polypropylene film being drawn over the heated plate and it was still effective (in that no instances of sticking had occurred) after 3 days at 145° C.

Example 4

The type-bars were removed from six typewriters, each set being strung on a wire and placed in an oven at 90° C. After 5 minutes they were taken out of the oven and sprayed immediately wtih a dispersion prepared as described in Example 1, containing 54% of polytetrafluoroethylene and 46% of vinylidene chloride copolymer, diluted with an equal part of water. After cooling, the type-bars were replaced in the typewriters. Although the coating softened the edges of the type somewhat, it prevented ink being picked up from the ribbon and the type thus gave a good clean impression. Less frequent cleaning was necessary. The ribbons lasted much longer, and there was also less wear on the platen.

Example 5

Nitrile rubber conveyor belting was preheated to 90° C. and sprayed with a diluted dispersion as used in Example 4. The belt was thus provided with a thin even antifrictional coat without the need for after-heating.

Example 6

Using a Dixon pilot coating machine (Model A.164), polyethylene terephthalate film was continuously coated with a dispersion prepared as described in Example 1, containing 54% of polytetrafluoroethylene and 46% of vinylidene chloride copolymer, diluted with an equal part of water containing sufficient alkyl aryl polyether alcohol to bring the concentration of polymeric non-ionic surface-active agent in the final dispersion up to 5%. The coating machine comprised a number of rollers for handling the continuous web of film, one of which rotated through a trough containing the dispersion and applied it to the film. An air knife was used to remove surplus liquid. Other rollers then led the web through an oven at an air temperature of 140° C. The speed of the web was 17 m./minute and the dried coating amounted to 1.3 g./m.$^2$.

Example 7

Paper in the form a continuous web was coated on a Dixon pilot coating machine with a dispersion as described in Example 6, the drying oven being at 100° C.

Example 8

Copper bullet heads filled with solder were preheated to 90° C. and then sprayed with a diluted dispersion as used in Example 4.

Example 9

Very fine fabrics of polyethylene terephthalate fibres were dipped in dispersions prepared as described in Example 1, containing 54% of polytetrafluoroethylene and 46% of vinylidene chloride copolymer, diluted with from 1 to 14 parts of water. The fabrics were then heated at 90° C. Materials treated in this way may be employed as non-stick waterproof dressings, e.g. for burns. Very fine nylon fabrics were similarly coated.

Example 10

Sheets of polypropylene and of nylon were preheated to 90° C. and sprayed with a diluted dispersion as used in Example 4 to give an anti-frictional coating.

Example 11

Beakers moulded from wood-filled urea-formaldehyde thermosetting plastic were preheated to 90° C. and sprayed with a diluted dispersion as used in Example 4 to give a non-stick coating and reduce their water pick-up.

Example 12

An aluminium coffee percolator was preheated to 90° C. and sprayed with a diluted dispersion as described in Example 4.

Example 13

Bowden wire cable preheated to 90° C. was drawn through an inverted babies' feeding teat filled with a diluted dispersion as used in Example 4. It dried to give an anti-frictional coating rendering the article remarkably easy in operation.

Example 14

The heating element of an electric kettle was preheated to 90° C. and then sprayed with a diluted dispersion as used in Example 4. The coated element was more easily cleaned of any subsequently acquired calcareous deposit than was a similar uncoated element.

I claim:
1. A polymeric coating composition comprising a dispersion in a volatile liquid of a tetrafluoroethylene polymer and a copolymer of vinylidene chloride, acrylonitrile and $0.5/X$ to $5/X$ mole percent of a comonomer containing at least one free carboxylic acid group where X is the number of free carboxylic acid groups in the molecule of said comonomer, the ratio of the weights of the tetrafluoroethylene polymer and said copolymer being in the range 9:1 to 1:19 and the copolymer itself containing 95 to 70% by weight of vinylidene chloride and a total of 5 to 30% by weight of acrylonitrile and said comonomer, said copolymer having a softening point in the amorphous form not greater than about 50° C., and said dispersion, when applied as a coating to a substrate, forming by evaporating said volatile liquid at 50° C. to 140° C., a film adherent to said substrate surface and comprising said tetrafluoroethylene polymer in unsintered particles of colloidal size held in a matrix of said copolymer.

2. A composition according to claim 1 in which the ratio of weights of said tetrafluoroethylene polymer and said copolymer is in the range 3:1 to 1:5.

3. A composition according to claim 1 in which said volatile liquid is water.

4. A composition according to claim 1 in which said tetrafluoroethylene polymer and said copolymer are both in the disperse phase and their combined amount is in the range 3 to 60% by weight of the dispersion.

5. A method of forming an adherent film on a substrate surface which comprises applying to said substrate surface a polymeric coating composition comprising a dispersion in a volatile liquid of a tetrafluoroethylene polymer and a copolymer of vinylidene chloride, acrylonitrile and $0.5/X$ to $5/X$ mole percent of a comonomer containing at least one free carboxylic acid group where X is the number of free carboxylic acid groups in the molecule of said comonomer, the ratio of the weights of the tetrafluoroethylene polymer and said copolymer being in the range 9:1 to 1:19 and the copolymer itself containing 95 to 70% by weight of vinylidene chloride and a total of 5 to 30% by weight of acrylonitrile and said comonomer, said copolymer having a softening point in the amorphous form not greater than about 50° C., and evaporating said volatile liquid at 50° C. to 140° C. to form a film adherent to said substrate surface and comprising said tetrafluoroethylene polymer in unsintered particles of colloidal size held in a matrix of said copolymer.

6. A film adherent to a substrate surface and comprising a tetrafluoroethylene polymer in unsintered particles of colloidal size held in a matrix of a copolymer of vinylidene chloride, acrylonitrile and $0.5/X$ to $5/X$ mole percent of a comonomer containing at least one free carboxylic acid group where X is the number of free carboxylic acid groups in the molecule of said comonomer, the ratio of the weights of the tetrafluoroethylene polymer and said copolymer being in the range 9:1 to 1:19 and the copolymer itself containing 95 to 70% by weight of vinylidene chloride and a total of 5 to 30% by weight of acrylonitrile and said comonomer, said copolymer having a softening point in the amorphous form not greater than about 50° C.

References Cited

UNITED STATES PATENTS

| | | | |
|---|---|---|---|
| 2,681,324 | 6/1954 | Hochberg | 260—900 |
| 3,030,260 | 4/1962 | Metzler et al. | 260—900 |

SAMUEL H. BLECH, *Primary Examiner.*

MURRAY TILLMAN, *Examiner.*

W. J. BRIGGS, *Assistant Examiner.*